(12) United States Patent
Sharma

(10) Patent No.: US 6,910,169 B2
(45) Date of Patent: *Jun. 21, 2005

(54) ECC CODE MECHANISM TO DETECT WIRE STUCK-AT FAULTS

(75) Inventor: Debendra Das Sharma, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 302 days.

This patent is subject to a terminal disclaimer.

(21) Appl. No.: 10/245,260

(22) Filed: Sep. 17, 2002

(65) Prior Publication Data

US 2003/0066006 A1 Apr. 3, 2003

Related U.S. Application Data

(63) Continuation of application No. 09/438,063, filed on Nov. 10, 1999, now Pat. No. 6,473,877.

(51) Int. Cl.[7] .......................... H03M 13/00; G01R 31/28
(52) U.S. Cl. .......................... 714/753; 714/712; 714/777
(58) Field of Search .................................. 714/753, 712, 714/777, 713, 752, 758, 43, 48, 52, 56; 341/94

(56) References Cited

U.S. PATENT DOCUMENTS

| | | | |
|---|---|---|---|
| 4,701,909 A | | 10/1987 | Kavehrad et al. |
| 4,965,883 A | | 10/1990 | Kirby |
| 5,432,800 A | * | 7/1995 | Kuroda et al. ............... 714/758 |
| 5,892,464 A | | 4/1999 | St. John et al. |
| 5,996,110 A | | 11/1999 | Kosmach |
| 6,084,535 A | * | 7/2000 | Karabed et al. ............... 341/58 |
| 6,170,073 B1 | * | 1/2001 | Jarvinen et al. ............ 714/758 |
| 6,473,877 B1 | | 10/2002 | Sharma |

OTHER PUBLICATIONS

Rao, T. et al., "Error Control Coding for Computer Systems," Prentice–Hall, Inc., Englewood Cliffs, NJ 07632, (1989), pp. 48–86, 114–117.

NN, "Checking Algorithm for Two Byte RAM with One or Two Byte Access," IBM Tech. Disclosure Bulletin, vol. 37, No. 04B, (Apr. 1994), pp. 655–657.

UntraSPARC –II Data Buffer (UDB–II) Data Sheet, Sun Microelectronics, STP1081, (Oct. 1996), p. 1–36. http://www.eecis.udel.edu/nsfri/docs/Ultra–II/Data–Buffer.pdf.

Shirvani, Phillip P., "Detecting Data Access Errors," Center for Reliable Computing, RATS, (Jul. 20, 1998), p. 1–4, http://www–crc.stanford.edu/crc_slides/shirvani072098.pdf.

Reed and Chen, "Error–Control Coding for Data Networks," (Jun. 1999), pp. 176–183.

Chen, C.L., et al., "Error Correcting Codes for Semiconductor Memory Applications: A State–of–the Art Review," IBM J. Res. Develop., vol. 28, No. 2, (Mar. 1984), pp. 124–134.

* cited by examiner

*Primary Examiner*—Christine T. Tu

(57) ABSTRACT

The inventive mechanism detects wire stuck-at faults, which can be used with any other ECC code. The inventive mechanism determines the number of 1's (or 0's) in the data portion and the ECC code of the data portion. This counted number is then provided with ECC code. The data portion, its ECC, the counted number, and its ECC are transmitted to the destination. At the destination, the message is decoded, and the number of 1's in the received message is compared with the counted number, if there is a discrepancy, then a wire fault is signaled. The mechanism may also detect any number of faults provided the number of 0 to 1 transitions is not the same as the number of 1 to 0 transitions. The mechanism can be reconfigured to work with any transmission wire width.

26 Claims, 2 Drawing Sheets

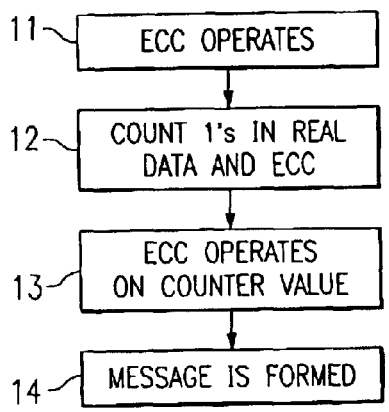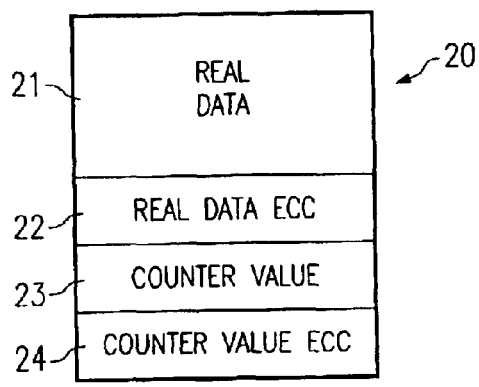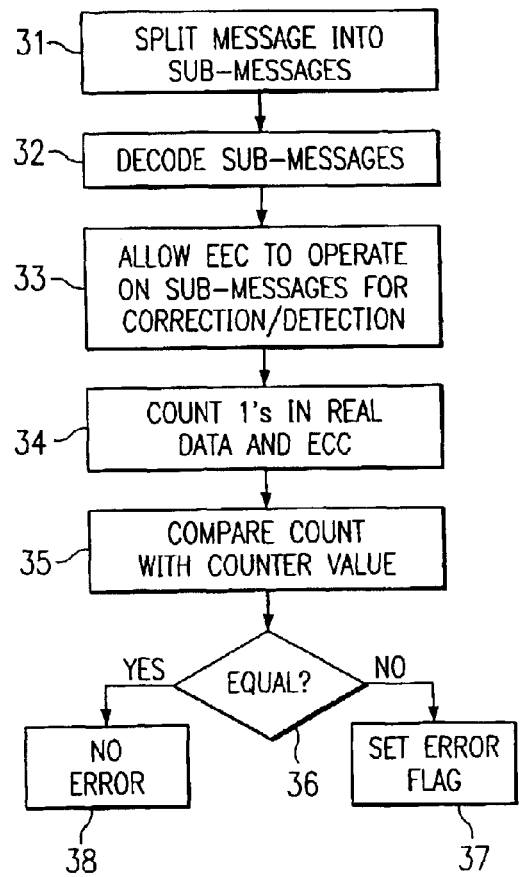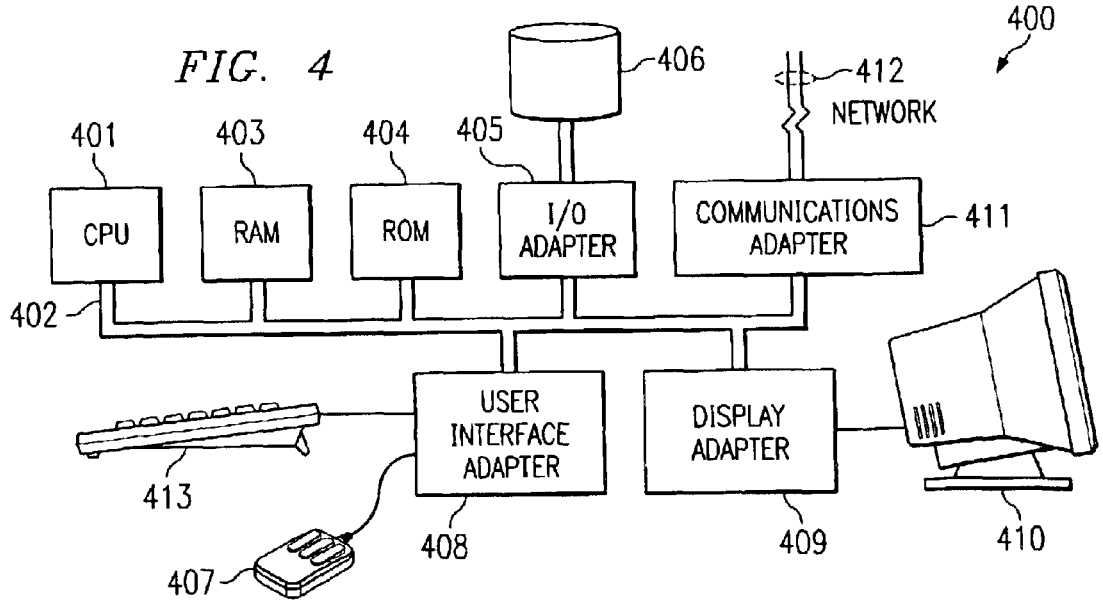

FIG. 5

| $d_4$ | $d_3$ | $d_2$ | $d_1$ | $d_0$ | — 51 |
| $d_9$ | $d_8$ | $d_7$ | $d_6$ | $d_5$ | |
| | | ⋮ | | | |
| $d_{69}$ | $d_{68}$ | $d_{67}$ | $d_{66}$ | $d_{65}$ | |
| $c_2$ | $c_1$ | $c_0$ | $d_{71}$ | $d_{70}$ | |
| $c_7$ | $c_6$ | $c_5$ | $c_4$ | $c_3$ | — 52 |
| $AC_0$ | $c_{11}$ | $c_{10}$ | $c_9$ | $c_8$ | |
| $AC_5$ | $AC_4$ | $AC_3$ | $AC_2$ | $AC_1$ | |
| | | | $AC_7$ | $AC_6$ | — 53 |

FIG. 6

| $d_4$ | $d_3$ | $d_2$ | $d_1$ | $d_0$ | — 61 |
| $d_9$ | $d_8$ | $d_7$ | $d_6$ | $d_5$ | |
| | | ⋮ | | | |
| $d_{69}$ | $d_{68}$ | $d_{67}$ | $d_{66}$ | $d_{65}$ | |
| $c_2$ | $c_1$ | $c_0$ | $d_{71}$ | $d_{70}$ | |
| $c_7$ | $c_6$ | $c_5$ | $c_4$ | $c_3$ | |
| $AC_2$ | $AC_1$ | $AC_0$ | $c_9$ | $c_8$ | |
| | | $AC_5$ | $AC_4$ | $AC_3$ | — 63 |

FIG. 7

| $d_4$ | $d_3$ | $d_2$ | $d_1$ | $d_0$ | |
| $d_9$ | $d_8$ | $d_7$ | $d_6$ | $d_5$ | — 71 |
| | | ⋮ | | | |
| $d_{59}$ | $d_{58}$ | $d_{57}$ | $d_{56}$ | $d_{55}$ | |
| $P_d$ | $d_{63}$ | $d_{62}$ | $d_{61}$ | $d_{60}$ | |
| $c_4$ | $c_3$ | $c_2$ | $c_1$ | $c_0$ | — 73 |
| $AC_1$ | $AC_0$ | $P_c$ | $c_6$ | $c_5$ | |
| | | $P_{AC}$ | $AC_3$ | $AC_2$ | — 75 |

FIG. 8

| $d_4$ | $d_3$ | $d_2$ | $d_1$ | $d_0$ | |
| $d_9$ | $d_8$ | $d_7$ | $d_6$ | $d_5$ | — 81 |
| | | ⋮ | | | |
| $d_{59}$ | $d_{58}$ | $d_{57}$ | $d_{56}$ | $d_{55}$ | |
| $P_d$ | $d_{63}$ | $d_{62}$ | $d_{61}$ | $d_{60}$ | |
| $P_{CL}$ | $c_3$ | $c_2$ | $c_1$ | $c_0$ | — 83 |
| $P_{CH}$ | | $c_6$ | $c_5$ | $c_4$ | — 85 |

FIG. 9

| $d_{16}$ | | | | | | | | | ⋅ | ⋅ | ⋅ | $d_2$ | $d_1$ | $d_0$ |
| $d_{33}$ | | | | | | | | | | ⋅ | ⋅ | ⋅ | | $d_{17}$ |
| $d_{50}$ | | | | | | | | | | ⋅ | ⋅ | ⋅ | | $d_{34}$ |
| $d_{67}$ | | | | | | | | | | ⋅ | ⋅ | ⋅ | | $d_{51}$ |
| | | | | $c_7$ | $c_6$ | $c_5$ | $c_4$ | $c_3$ | $c_2$ | $c_1$ | $c_0$ | $d_{71}$ | $d_{70}$ | $d_{69}$ | $d_{68}$ |

ECC CODE MECHANISM TO DETECT WIRE STUCK-AT FAULTS

CROSS-REFERENCE TO RELATED APPLICATIONS

This application is a continuation of U.S. Utility patent application Ser. No. 09/438,063 entitled "ECC CODE MECHANISM TO DETECT WIRE STUCK-AT FAULTS," filed Nov. 10, 1999, now U.S. Pat. No. 6,473,877 the disclosure of which is hereby incorporated herein by reference.

FIELD OF THE INVENTION

This application relates in general to error correction code, and in specific to error correction code that detects wire failure, particularly stuck-at-fault wire failures.

BACKGROUND OF THE INVENTION

In the prior art, data that is transmitted over wires frequently incurs errors, i.e. a binary 1 is distorted to appear as a binary 0 or vice versa. The errors may be single bit errors, where one bit in the data stream is corrupted, or double bit errors, where two bits in the data stream are corrupted. Note that typically, the data is transmitted over a set of wires, rather than a single wire, however errors could occur in both single wire and multiple wire transmission systems. Furthermore, the data is much longer than the number of wires, and thus is sent over multiple cycles, e.g. 16 wires are cycled 4 times to send 64 bits. Therefore, errors may occur over multiple cycles. In some systems, the data is packetized, which means that the data is delivered in specifically sized data packets. Thus, errors could occur in different data packets. One of the typical causes of errors is wire failures. Shorts or breaks in the wire can cause faulty signals to be sent down the wire. These failures are classified as one of two types. The first type is where the wire is either stuck-at-one or stuck-at-zero. Thus, whatever the input, the wire relays only a one (for stuck-at-one) or zero (for stuck-at-zero), and does not switch the signal. The second type is a malicious failure. This type of failure is where the output of the wire is switching, regardless of the input. For example, where the input is a zero, the wire output could be either a one or zero and where the input is a one, the wire output could be either a one or zero. In other words, the behavior of the wire is unpredictable. Furthermore, the error may be masked, because the wire failure may deliver the correct result.

To detect such errors, ECC code is transmitted along with the data. Cyclic codes are a type of ECC code that possess the capability to detect wire failures. Cyclic codes are an important class of codes. The generator/parity matrix for these codes are formed by the cyclic shift of a row. There are efficient cyclic codes for detection/correction of multiple random errors, byte errors and burst errors. Cyclic codes are discussed further in "Error Control Coding for Computer Systems" by T. R. N., Rao and E. Fujiwara, Prentice Hall, Englewood Cliffs, N.J. 07632, ISBN 0-13-28395-9, which is hereby incorporated by reference. Cyclic codes are directed at detecting malicious failures, and thus assume failures are malicious failures. Since the cyclic codes target for the latter, they require more bits than checking for stuck-at-fault failures, and the required number of bits may be more than a designer may have to spare. For example, assume a data message comprises 32 bytes, which is 256 bits. To allow for single bit error and double bit error detection 10 extra bits are required, the single error correction requires 9 bits, since $2^9$ is the smallest power of 2 that is greater than (256+9). The $10^{th}$ bit is used for detecting double bit errors, for a total of 266 bits. Thus, 10 bits are required for doing single error correction and double error detection. If these 266 bits are going to be transported across 10 wires, then 6 wires would carry 27 bits, and 4 wires would carry 26 bits. Thus, a wire failure could affect up to 27 bits. To detect malicious wire failures, 27 additional bits are required, see Theorem 3.7 from the book by Rao and Fujiwara, wherein a cyclic code generated by g(x) (of degree γ) can detect any burst of length γ or less. This will detect a wire failure plus any burst of length 27 or less extending over two consecutive wires, for a total of 293 bits. Thus, a total of 37 bits are required for error detection. This is a large amount of overhead which will consume a great proportion of system resources for transmission.

While 37 bits represents only 13% of 293 bits, a higher percentage of overhead may result from the extra bits needed for error detection, particularly when the data is transmitted in blocks or packets. For example, suppose a block of data comprises 7 cycles of data across 10 wires, for a total of 70 bits per block. Then 256 bits would require four blocks (3.6 blocks rounded up), while 293 bits would require five blocks (4.1 blocks rounded up). Thus, error detection would require an extra block or 20%.

In addition to adding overhead for data transmission, cyclic codes are more complex to implement. Decoding on the receiving end is complicated as many different mechanisms exist for implementing cyclic codes.

Therefore, there is a need in the art for error detection mechanism that detects wire stuck-at-faults which does not require significant overhead and is easy to implement.

BRIEF SUMMARY OF THE INVENTION

These and other objects, features and technical advantages are achieved by a system and method that uses an error detection mechanism to detect wire stuck-at faults. This mechanism can be used to augment an existing ECC code with wire stuck-at fault detection capability. For example, existing ECC code may detect random single errors or double errors (SEC-DED) in data transmission, whereas the inventive mechanism detects a wire failure which errors in the data transmitted on the failed wire. The inventive mechanism determines the number of 1's (or 0's) in a message, including the existing ECC code for the message, and appends the message with this information. This count is itself protected by the same ECC code that is used for the message. When the message is decoded at the receiving location, any stuck-at-fault wire failures would be detected from comparing the appending information with the contents of the message.

In addition to detecting wire stuck-at faults, the mechanism may also detect any number of multiple errors if the number of 0 to 1 transitions does not equal the number of 1 to 0 transitions in the data portion after decode. The advantages of the inventive mechanism over the prior art cyclic codes is the lower number of required check bits, a relatively simpler implementation, and the capability to trade-off wire failure detection for the number of additional checkbits required. The inventive mechanism is particularly useful in the detection of multiple errors occurring when the code word is transmitted over multiple cycles with a wire failure.

The inventive mechanism will detect stuck-at-fault failures, and most malicious wire failures. The inventive mechanism will not detect all malicious wire failures, particularly those where the number of 0 to 1 transitions equals the number of 1 to 0 transitions after ECC decode. Thus, the invention is primarily intended to detect predictable failures, e.g. stuck-at-faults, where a wire is stuck at 0 or 1, which causes a change in the number of 1's or 0's in the data transmission. The inventive mechanism can be scaled according to the number of wires used in data transmission.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

FIG. 1 depicts a flow diagram of the inventive mechanism encoding a message;

FIG. 2 depicts the message encoded by FIG. 1;

FIG. 3 depicts a flow diagram of the inventive mechanism decoding the message of FIG. 2;

FIG. 4 depicts a block diagram of a computer system adapted to implement the present invention of FIGS. 1 and 3; and FIGS. 5–9 depict exemplary data messages of FIG. 2 formed from the different embodiments of the invention of FIG. 1.

DETAILED DESCRIPTION OF THE INVENTION

The inventive error detection mechanism encodes messages as shown in FIG. 1. The inventive mechanism allows the error correction code (ECC) (if any) to operate on the real data 11. The mechanism then treats the data bits and the associated ECC checkbits (if any) as its 'data' that it protects from wire stuck-at faults. The inventive mechanism counts 12 the number of 1's in the data part, i.e. the real data and checkbits, and stores the number as a counter value. The inventive mechanism can protect the counter value bits by adding ECC check bits 13 so that the counter value is protected with the same ECC scheme as in the data part. Thus the inventive mechanism forms 14 a data message 20 comprising four parts: the real data part 21, the ECC check bits 22 protecting the real data, the counter value 23 with the number of 1's in the real data and its check bits, and check bits 24 protecting the counter value with the same ECC capability as the data part, as shown in FIG. 2. Thus, the transmitted message is encoded with the real data, real data ECC, counter value, and counter value ECC. The message is then transmitted to the destination location via a transmission line or other transmission system. Note that although the invention has been described in terms of the ECC capabilities of the single-error correcting and double error-detecting (SEC-DED) code, the invention may work with any ECC code, including parity. Further note that although the invention has been described in terms of count 1's, the invention may also operate by counting 0's instead of counting 1's.

A second instantiation of the inventive mechanism that is located at the destination of the message decodes the message as shown in FIG. 3. During decoding, the message is split into two sub-messages 31. The first sub-message comprises the real data and the real data ECC, and the second sub-message comprises the counter value and the counter value ECC. The first and second messages are then decoded separately according the ECC mechanism used for encoding 32. Any single bit errors in either the real data or the counter value would be detected and corrected via their respective ECC 33. Any double errors in either the real data or the counter value would be detected via their respective ECC 33. If a double error is found then the message is discarded and a resend or retry signal is sent to the originator of the message. After completion of SEC-DED then wire failures can be detected. The inventive mechanism then counts the number of 1's in the decoded real data and real data ECC 34. The decoded counter value is then compared 35 with the counted number of 1's in the decoded real data plus the real data ECC check bits to determine if there is a wire stuck-at fault 36. During this check, any multiple errors, including malicious wire failures, that are present also are detected, unless offsetting multiple errors have occurred. Note that a malicious wire failure would be a wire that changes the transmitted values randomly. Offsetting multiple errors is where the number of 0 to 1 transitions equals the number of 1 to 0 transitions. An error is flagged 37 if the counter value does not match the number of 1's in the real data plus real data ECC. After a wire error is detected the data is considered corrupted. Different systems may invoke different error recovery mechanisms. Otherwise, no detectable error occurred during transmission of the message 38.

For example, consider a channel that is 17 bits wide or 17 wires wide, that is transferring a message packet with 64 bits of real data. Moreover, all single errors are to be corrected, all double errors are to be detected, and wire failure is to be detected. The SEC-DED code requires 8 check bits, forming a (72, 64) ECC code. This code does not possess the capability to detect wire failures, which could introduce up to 5 errors. Note that the 72 bits would be sent over 17 wires, and thus at least one wire will be carrying 5 bits of the message, and if this wire fails, then up to 5 errors will occur. As the real data plus the real data ECC is 72 bits, then the real data plus real data ECC may have a total of 72 1's. Therefore, the counter value will be a 7 bit value. The counter value itself will be protected by 5 bits of ECC forming a (12,7) SEC-DED ECC code. Thus, the message formed by inventive mechanism is 84 bits, 64 of which are real data. The message would be a (84,64) code. The encoded message is transmitted over 5 cycles through the channel (since the channel comprises 17 wires).

The counter value is protected with the same ECC as the real data so that the overall message is guaranteed to be at the desired ECC (in this case the SEC-DED). Suppose, for example, that the counter value is not protected with ECC. Then, a single bit error in the counter value would cause a mismatch in the number of 1's with respect to the real data plus real data ECC. This mismatch would in turn cause an erroneous wire fault flag to be issued. Moreover, a wire error could occur with an error pattern that escapes detection. For example, an error pattern due to a wire failure which introduces 4 total errors, with 3 errors in the 72 real data plus real data ECC bits and 1 error in the counter value. The (72, 64) ECC does not guarantee detection of 3 errors and may give a decoded bit pattern with 2 or 4 errors. With one of the bits in the counter changing, there may be a possibility that the erroneous data will pass through. It may also be possible for other error patterns along a wire failure to go undetected. Thus, protecting the counter value with some ECC prevents these problems from occurring.

However, the counter value plus the counter value ECC should not exceed two bits on the same wire. For example, if there are 17 wires for transmission, then the counter value plus counter value ECC should not exceed 34 bits, assuming SEC-DED ECC. In other words, the counter value and the counter value ECC cannot be more than twice the wire width of the transmission channel. This restriction ensures that errors in the counter value due to a wire failure will be detected by the ECC. Thus, any single error in the counter value will be corrected, and any double errors in the counter value, either random or due to a wire failure, can be detected. Therefore, the counter value is protected with single error correction, double error detection, and wire failure detection. Note that the restriction depends upon the type of ECC used, as type of ECC used affects the size of the message as well as the number of errors that can be detected. For example if single error detection (SED) ECC is used then the counter value plus counter value ECC should not exceed the wire size, as only single error can be detected, however the size of the ECC would be smaller as the number of bits for SED is less than SEC-DED. If the ECC being used on the real data is a parity bit, then it will be sufficient to protect the counter value with a parity bit, provided that the counter itself and the parity bit will protect against wire failure. In general terms, the size of the counter value plus counter value ECC should not exceed the size of the channel times the number of errors that can be detected by the ECC. Note that different types of ECC can be used. For example, the data may be protected with SEC-DED ECC, SED ECC, or double error correcting-triple error detecting ECC code, or any other types of ECC code.

However, the inventive error detection mechanism can be reconfigured to accommodate situations where the counter value plus counter value ECC exceeds the above restrictions. For example, using the previously described (72,64) code the channel is 5 bits wide instead of 17 bits wide. The sub-message of the counter value and the counter value ECC is still 12 bits total and forms a (12, 7) code. Thus, two bits of the sub-message would be transmitted in a third cycle (i.e. 10 bits would be sent in the first two cycles). As three bits would be sent on at least one wire, then SEC-DED ECC could not guarantee the accuracy of the counter value.

A first solution is to use multiple counters values, with each counter value having its own ECC check bits. For example, if the ECC is SEC-DED, then when the counter value and the counter value ECC check bits are more than twice the wire width, then a second counter value is formed by counting the number of 1's in the first counter value and its ECC check bits. The second counter value would then be appended with ECC check bits. This process will go on recursively until the last counter value and its ECC check bits are less than twice the wire width. The first counter value has (log k) bits, k being the number of information bits. The second counter value, if required, will have (log (log k)) bits. FIG. 5 depicts the first solution with the example above to form data packet message 50, that includes 72 data bits 51, $d_0 \ldots d_{71}$, which includes SEC-DED ECC bits, and 12 first counter bits 52, $C_0 \ldots C_{11}$, which includes SEC-DED ECC bits. In this example a second counter is required. The second counter value holds the number of 1's in the first counter value, which needs to be 4 bits wide to hold the number of 1's in the 12 bit code. To protect the second counter value of 4 bits, 4 bits of ECC are required. This forms a (8, 4) SEC-DED code 53, $AC_0 \ldots AC_7$. These 8 bits can be transmitted over 5 wires in two cycles. Since, the second counter value and the second counter value ECC can be transmitted in less than three cycles, there is no need for a third counter. Note that this code forms a third sub-message, which would be decoded separately from the other two sub-messages. Therefore a total of 20 bits of counter value and counter value ECC would be appended to the real data and real data ECC.

A second solution would be to have selected bits of the first counter value ECC protected separately without requiring additional counters values. The bits of the counter value are encoded in separate groups such that after ECC, the total number of bits in any group does not exceed twice the channel width. In other words, the bits of the counter value are split into multiple ECC codes. FIG. 6 depicts the second solution with the example above to form data packet message 60, that includes 72 data bits 61, $d_0 \ldots , d_{71}$, which includes SEC-DED ECC bits, and 10 first counter bits 62, $C_0 \ldots C_9$, which includes SEC-DED ECC bits. In the above example, for the first solution, the counter value plus ECC 52 was 12 bits wide, however the total of size of the code can be up to 10 bits. Five bits of the 7 bit counter value can be protected with 5 bits of ECC, thus forming a (10,5) SEC-DED ECC code 62. Note that this (10,5) code would suffice since the 10 bits will be transmitted in 2 cycles. The remaining two bits of the counter value would be protected with 4 bits of ECC, thus forming a (6,2) code 63. Therefore, this solution results in a total of 16 bits of counter value and counter value ECC being appended to the real data and the real data ECC. Note that in this example, solution two yields a better result than solution one, however different values would yield different results. In both solutions, the counter value is protected.

Another example is as follows. Suppose 64 bits are to be transmitted using 5 wires, and the desired error detection is to detect any single error in addition to wire stuck at fault. Thus, the single error detection mechanism requires 65 bits (64 for data+1 parity bit). FIG. 7 depicts a message data protect 70 for the first solution with the 64 bit example, which includes 64 data bits 71, $d_0$–$d_{63}$, and parity bit Pd 72 for data bits 71. Thus, 65 bits being transmitted over 5 wires requires a counter with a width of 7 bits, $C_0$–$C_6$ 73. These 7 bits counter would be protected by another parity bit, a PC 74, requiring 8 bits. Since these 8 bits are vulnerable to wire failures (some bits will go over one wire twice), a second counter is needed that is 4 bits wide, $AC_0$–$AC_3$ 75 a parity PAC 76 protects this counter for a total of 5 bits. Since there are 5 wires, more counters are not needed. The second solution would be (FIG. 8) to take 4 bits of the 7 bit counter and parity protect it. The remaining 3 bits get parity protected separately. FIG. 8 depicts a message data packet 80 for the second solution with the 64 data bit example, which includes 64 data bits 81, $d_0$–$d_{63}$, and parity bit Pd 82 for data bits 81. Thus, 65 bits being transmitted over 5 wires requires a counter with a width of 7 bits. The second solution divides the counter into multiple parts, with 5 wires the maximum size is 5 bits. Since 1 parity bit is required for protection, the counter is broken into segments no larger than 4 bits. Thus, 4 bits of the counter, $C_0$–$C_3$, 83 are protected with parity bit PCL 84, and 3 bits of the counter, $C_4$–$C_6$ are protected with parity bit PCH 85. Note that the counters are shown as being segmented into 4 lower bits and 3 upper bits, however other divisions are possible. Note that the parity bits are unnecessary to detect single errors since the wire stuck at fault covers it. However they are used as an example since wire fault detection may not cover all types of ECC (e.g., SEC_DED).

A third solution is to reduce the size of the counter value, i.e. have a counter value that is less wide. The smaller the counter value, then the smaller the sub-message. Moreover, the smaller the counter value, then the fewer the ECC bits that are required for protection, which in turn results in a smaller sub-message. Consider the example discussed above, where the channel is 17 bits wide, that is transferring a message packet 90 with 64 bits of real data, with 8 bits of ECC check bits, forming a (72,64) code as shown in FIG. 9. Note that the 72 bits would be sent over 17 wires, in 5 cycles, and thus at least one wire will be carrying 5 bits of the message, and if this wire fails or is stuck-at-fault, then 5 errors will occur. Thus, a wire stuck at failure could only affect the counter by −5 (i.e. wire stuck at 0 and the real values are 1's) through +5 (i.e. wire stuck at 1 and the real values are 0s). Hence, a counter of width 4 bits would have sufficed since it can tolerate a swing of 10. Thus, a (8, 4) SEC-DED ECC code 92, i.e. $C_0$–$C_7$ is required to protect the counter value rather than the (12,7) code that is required for the earlier embodiment. In general terms, the counter value should have width that is the upper ceiling of logarithm (base 2) of twice the number of cycles through which the entire code word is transmitted. Therefore, in this example, the number of 1's modulo 16 are being counted. This is performed by adding the 1's and doing a modulo operate while counting you may have the full width but while sending you chop off extra upper bits. The third solution is the preferred embodiment.

Note that the designer can also decide to have a lower number of counter value bits than required for a lower reliability, as a trade-off between detection and overhead (in terms of the number of check bits). In other words, the counter bits can be reduced a number below what is required to provide wire stuck at fault detection, but then wire stuck at fault detection can not be guaranteed.

Also note that the counter value and the real data bits can be ECC protected together, if there is a shortage of check bits. However, this will not provide complete coverage against wire failures or stuck-at-faults. For example, suppose there is data and a counter with simple parity protection, and a wire failure occurs that changes 1 bit in the data and 1 bit in the counter (least significant bit). The parity will not detect the error and neither will the counter. Thus, in the above example, 4 bits for counter are required for 64 bits for data. To protect these 68 bits, 8 bits of ECC data are required, thus forming a (76, 68) SEC-DED ECC code.

Further note that a single wire failure can be detected, however multiple wire failures may not be detected if the number of 0 to 1 transitions equals the number of 1 to 0 transitions. Thus, while some multiple wire failures may be detected, not all wire failures can be detected.

Further note that the invention can operate in any data transmission environment that involves multiple wires and ECC is used, for example, between two computer connected via a LAN, WAN or Internet. The invention can also be used for data transmission within a computer system, e.g. between a RAM and CPU. This is particularly true for multi-processor systems.

FIG. 4 illustrates a computer system 400 adapted for use with the present invention. The wires that are used to send data bits could be the bus 402 or the bus linking 405–406 or the network 412. In the system 400, central processing unit (CPU) 401 is coupled to bus 402. In addition, bus 402 is coupled to random access memory (RAM) 403, read only memory (ROM) 404, input/output (I/O) card 405, communications card 411, user interface card 408, and display card 409. RAM 403 and ROM 404 hold user and system data and programs as is well known in the art. I/O card 405 connects storage devices, such as hard drive 406, to the computer system. Communications card 411 is adapted to couple the computer system to a local, wide-area, or Internet network 412. User interface card 408 couples user input devices, such as keyboard 413 and pointing device 407, to the computer system 400. Finally, display card 409 is driven by CPU 401 to control the display on display device 410. CPU 401 may be any general purpose CPU, such as a HP PA-8200. However, the present invention is not restricted by the architecture of CPU 401 as long as CPU 401 supports the inventive operations as described herein. Note that the term error code (EC) means correction and/or detection.

Although the present invention and its advantages have been described in detail, it should be understood that various changes, substitutions and alterations can be made herein without departing from the spirit and scope of the invention as defined by the appended claims.

What is claimed is:

1. A method for forming a data message for transmission, comprising:

determining a counter value that represents a number of a specific bit present in the data message;

forming an error code (EC) portion that is associated with the counter value; and encoding the data message with the counter value and the EC portion.

2. The method of claim 1, wherein the data message comprises a data portion, the method further comprising:

forming another EC portion that is associated with the data portion.

3. The method of claim 1, wherein the specific bit is selected from the group consisting of a binary one and a binary zero.

4. The method of claim 1, wherein the encoded data message is delivered to a receiving entity, the method further comprising:

using, by the receiving entity, the encoded counter value to determine whether an error exists in the data message from a wire failure during transmission of the data message.

5. The method of claim 4, wherein the using, by the receiving entity, the encoded counter value, comprises:

splitting the message into at least two sub-messages, with the first sub-message comprising a data portion of the message and the second sub-message comprising the counter value and the EC portion;

determining another counter value that represents a number of the specific bit present in the first sub-message;

comparing the another counter value with the counter value of the second sub-message; and signaling an error if the step of comparison indicates that the another counter value is different from the counter value.

6. The method of claim 5, wherein the using, by the receiving entity, the encoded counter value, further comprises:

detecting errors in the second sub-message via the EC portion; and wherein detecting errors operates prior to the determining another counter value.

7. The method of claim 6, wherein:

the EC portion is one of a single error correcting and double error detecting code, and a single error detecting code.

8. The method of claim 1, wherein a size of the counter value and the EC portion is larger than a size that can be protected by the EC portion when compared to a width of a transmission path used in the transmission of the message, the method further comprising:

creating a subsequent counter value that represents a number of the specific bit present in the preceding counter value and the preceding EC portion;

forming a subsequent EC portion that is associated with the subsequent counter value; and repeating the steps of creating and forming until a size of the subsequent counter value and the subsequent EC is no larger than the size that can be protected by the subsequent ECC when compared to the width of the transmission path.

9. The method of claim 1, wherein a size of the counter value and the EC portion is larger than a size that can be protected by the EC portion when compared to a width of a transmission path used in the transmission of the message, the method further comprising:

separating the counter value into a plurality of counter value portions; and forming a plurality EC portions, each of which is associated with a particular one of the plurality of counter value portions;

wherein a size of each counter value portion and its associated EC portion is no larger than the size that can be protected by the associated EC when compared to the width of the transmission path.

10. The method of claim 1, further comprising the steps of:

truncating the counter value by removing the higher order bits such that the remaining bits are wide enough to indicate twice a number of cycles required to transmit the data message;

wherein the step of truncating operates prior to the step of forming the EC portion.

11. A method for forming a data message for transmission, wherein the data message comprises a data portion, the method comprising:

determining a counter value that represents a number of a specific bit present in the data portion;

truncating the counter value by removing the higher order bits such that the remaining bits are wide enough to indicate twice a number of cycles required to transmit the data portion; and encoding the data message with the truncated counter value.

12. The method of claim 11, wherein the specific bit is selected from the group consisting of a binary one and a binary zero.

13. The method of claim 11, wherein the encoded data message is delivered to a receiving entity, the method further comprising:

using, by the receiving entity, the encoded counter value to determine whether an error exists in the data portion from a wire failure during transmission of the data message.

14. A computer program product having a computer readable medium having computer program logic recorded thereon for forming a data message for transmission, the computer program product comprising:

means for determining a counter value that represents a number of a specific bit present in the data message;

means for forming an error code (EC) portion that is associated with the counter value; and means for encoding the data message with the counter value and the EC portion.

15. The computer program produce of claim 14, further comprising:

means for using the encoded counter value to determine whether an error exists in the data message from a wire failure during transmission of the data message.

16. The computer program product of claim 15, wherein the means for using comprises:

means for splitting the message into at least two sub-messages, with the first sub-message comprising a data portion of the data message, and the second sub-message comprising the counter value and the EC portion;

means for determining another counter value that represents a number of the specific bit present in the first sub-message;

means for comparing the another counter value with the counter value of the second sub-message; and means for signaling an error if the step of comparison indicates that the another counter value is different from the counter value.

17. The computer program product of claim 16, wherein the means for using further comprises:

means for detecting errors in the second sub-message via the EC portion;

wherein the means for detecting errors operates prior to the means for determining another counter value.

18. The computer program produce of claim 14, wherein the data message comprises a data portion and another EC portion that is associated with the data portion.

19. The computer program produce of claim 14, wherein the specific bit is selected from the group consisting of a binary one and a binary zero.

20. The computer program product of claim 14, wherein:

the EC portion is one of a single error correcting and double error detecting code, and a single error detecting code.

21. The computer program product of claim 14, wherein a size of the counter value and the EC portion is larger than a size that can be protected by the EC portion when compared to a width of a transmission path used in the transmission of the message, the computer program product further comprising:

means for creating a subsequent counter value that represents a number of the specific bit present in the preceding counter value and the preceding EC portion;

means for forming a subsequent EC portion that is associated with the subsequent counter value; and means for repeating the steps of creating and forming until a size of the subsequent counter value and the subsequent EC is no larger than the size that can be protected by the subsequent ECC when compared to the width of the transmission path.

22. The computer program product of claim 14, wherein a size of the counter value and the EC portion is larger than a size that can be protected by the EC portion when compared to a width of a transmission path used in the transmission of the message, the computer program product further comprising:

means for separating the counter value into a plurality of counter value portions; and means for forming a plurality EC portions, each of which is associated with a particular one of the plurality of counter value portions;

wherein a size of each counter value portion and its associated EC portion is no larger than the size that can be protected by the associated EC when compared to the width of the transmission path.

23. The computer program product of claim 14, further comprising:

means for truncating the counter value by removing the higher order bits such that the remaining bits are wide enough to indicate twice a number of cycles required to transmit the data message;

wherein the means for truncating operates prior to the means for forming the EC portion.

24. A computer program product having a computer readable medium having computer program logic recorded thereon for forming a data message for transmission, wherein the data message comprises a data portion, the computer program product comprising:

means for determining a counter value that represents a number of a specific bit present in the data portion;

means for truncating the counter value by removing the higher order bits such that the remaining bits are wide enough to indicate twice a number of cycles required to transmit the data portion; and means for encoding the data message with the truncated counter value.

25. The computer program product of claim 24, further comprising:

means for using the encoded counter value to determine whether an error exists in the data portion from a wire failure during transmission of the data message.

26. The computer program product of claim 24, wherein the specific bit is selected from the group consisting of a binary one and a binary zero.

* * * * *